United States Patent
Sugaya (10) Patent No.: US 11,501,417 B2
(45) Date of Patent: Nov. 15, 2022

(54) IMAGE PROCESSING APPARATUS FOR ESTIMATING THE NUMBER OF SPECIFIC OBJECTS IN AN IMAGE

(71) Applicant: CANON KABUSHIKI KAISHA, Tokyo (JP)

(72) Inventor: Atsuto Sugaya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/023,205

(22) Filed: Sep. 16, 2020

(65) Prior Publication Data

US 2021/0090223 A1     Mar. 25, 2021

(30) Foreign Application Priority Data

Sep. 19, 2019    (JP) .............................. JP2019-170665

(51) Int. Cl.
    *G06T 5/00*       (2006.01)
    *G06T 5/40*       (2006.01)
    *G06T 5/50*       (2006.01)

(52) U.S. Cl.
    CPC ................ *G06T 5/009* (2013.01); *G06T 5/40* (2013.01); *G06T 5/50* (2013.01)

(58) Field of Classification Search
    CPC . G06T 5/40; G06T 5/009; G06T 2207/20021; G06K 9/00228; G06K 9/36
    See application file for complete search history.

(56) References Cited

U.S. PATENT DOCUMENTS

| 9,497,355 | B2 * | 11/2016 | Hayasaki ............. H04N 1/6086 |
| 2010/0208105 | A1 | 8/2010 | Kubota |
| 2013/0182185 | A1 * | 7/2013 | Koyama ................ H04N 5/202 348/672 |
| 2014/0354841 | A1 | 12/2014 | Nakata |
| 2018/0240251 | A1 * | 8/2018 | Kitagawa .................. G06T 7/73 |

FOREIGN PATENT DOCUMENTS

| JP | 2002305683 A | 10/2002 |
| JP | 6486055 B2 | 3/2019 |

* cited by examiner

*Primary Examiner* — Li Liu
(74) *Attorney, Agent, or Firm* — Canon U.S.A., Inc. IP Division (57) ABSTRACT

An image processing apparatus comprising a first correction unit which performs first gray-level correction on an image of a target region using a first correction amount, a first estimation unit which estimates a number of specific objects in the image of the target region corrected by the first correction unit, a second correction unit which performs second gray-level correction on the image of the target region using a second correction amount that is different from the first correction amount, a second estimation unit which estimates the number of specific objects in the image of the target region corrected by the second correction unit; and a selection unit which selects a larger one of the number of the specific objects estimated by the first estimation unit and the number of the specific objects estimated by the second estimation unit.

7 Claims, 7 Drawing Sheets

IMAGE PROCESSING APPARATUS FOR ESTIMATING THE NUMBER OF SPECIFIC OBJECTS IN AN IMAGE

BACKGROUND OF THE INVENTION

Field of the Invention

The present disclosure relates to an image processing apparatus, an image processing method, and a non-transitory computer-readable storage medium.

Description of the Related Art

There is a known technique for analyzing images acquired from a monitoring camera at regular time intervals and recording the number of specific objects, such as human bodies and vehicles, in an image-sensing range with the aim of grasping of a congestion situation or utilization in marketing. Examples of a method of estimating the number of specific objects include a technique for measuring the number of people detected by a human body detecting unit and a technique for estimating the number of specific objects from a degree of congestion calculated on the basis of results of detecting a change amount and motion between consequent frame images.

The estimation is made on the basis of feature points calculated from images and detection results of motion in the technologies described above, so that accuracy in estimation varies depending on a contrast of an input image and decreases in a low contrast state, e.g., especially in a case where images are captured in fog or mist, and in a case where images are captured through glass.

As a technique for emphasizing contrast, Japanese Patent No. 6486055 discusses a technique for performing gray-level correction in accordance with a degree of correction that is set from a histogram of an image. Japanese Patent Laid-Open No. 2002-305683 discusses a technique for performing gray-level correction with reference to a specific target region of the image.

However, since the conventional techniques discussed in the patent literatures described above are not directed to estimating the number of specific objects, there may be a case where the gray-level correction according to the conventional techniques is not preferable in terms of processing of estimating the number of specific objects even if image quality is improved. Thus, the conventional techniques are not suitable for enhancement of accuracy in estimating the number of specific objects.

SUMMARY OF THE INVENTION

The present disclosure has been made in view of the above-mentioned issue and is directed to enhancing accuracy in estimating the number of specific objects in an image.

According to a first aspect of the invention, there is provided an image processing apparatus, comprising: a first correction unit configured to perform first gray-level correction on an image using a first correction amount; a first estimation unit configured to estimate a number of specific objects in the image corrected by the first correction unit; a second correction unit configured to perform second gray-level correction on the image using a second correction amount that is different from the first correction amount; a second estimation unit configured to estimate the number of specific objects in the image corrected by the second correction unit; and a selection unit configured to select a larger one of the number of the specific objects estimated by the first estimation unit and the number of the specific objects estimated by the second estimation unit.

According to a second aspect of the invention, there is provided an image processing method, comprising: performing first gray-level correction on an image using a first correction amount; estimating a number of specific objects in the corrected image; performing second gray-level correction on the image using a second correction amount that is different from the first correction amount; estimating the number of the specific objects in the corrected image; and selecting a larger one of the estimated numbers of the specific objects.

According to a third aspect of the invention, there is provided a non-transitory computer-readable storage medium storing a program which, when read and executed by a computer, causes the computer to execute steps of an image processing method, the method comprising: performing first gray-level correction on an image using a first correction amount; estimating a number of specific objects in the corrected image; performing second gray-level correction on the image using a second correction amount that is different from the first correction amount; estimating the number of the specific objects in the corrected image; and selecting a larger one of the estimated numbers of the specific objects.

The present disclosure can enhance accuracy in estimating the number of specific objects in an image.

Further features of the present disclosure will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Exemplary Embodiment

Figure 1:
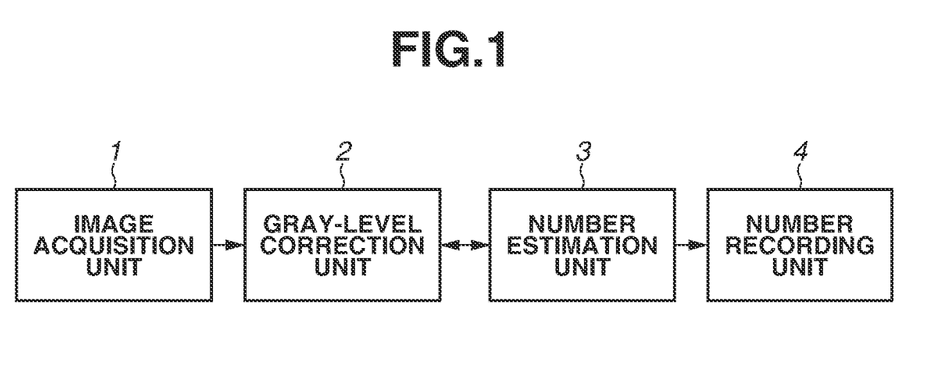
FIG. 1 is a block diagram illustrating a configuration example of an image processing apparatus according to a first exemplary embodiment.

FIG. 1 is a block diagram illustrating a configuration example of an image processing apparatus according to a first exemplary embodiment.

The image processing apparatus includes an image acquisition unit 1 that acquires an image, a gray-level correction unit 2 that corrects levels of gray of the acquired image, a number estimation unit 3 that estimates the number of specific objects in the corrected image, and a number recording unit 4 that records the number estimated by the number estimation unit 3.

The image acquisition unit 1 acquires an image from a region to be subjected to estimation of the number of specific objects (target region). The gray-level correction unit 2 performs gray-level correction on the image acquired by the image acquisition unit 1 on the basis of a predetermined correction amount. The number estimation unit 3 estimates the number of specific objects (e.g., the number of people in a case where the specific object is a human body) in an imaging range by analyzing the image that has been subjected to the gray-level correction by the gray-level correction unit 2. The number estimation unit 3 is capable of acquiring positional information about the specific objects on the image together with the number of people. The number recording unit 4 records the estimated number of the specific objects estimated by the number estimation unit 3. The number recording unit 4 records the positional information about the specific objects acquired by the number estimation unit 3.

The present exemplary embodiment will be described by using an example in which the number of human bodies as an example of the specific objects is estimated, but the specific objects are not limited thereto and may be vehicles or the like. A method for estimating the number of human bodies (the number of people) is not specifically limited, and may be a method for measuring the number of times a convex shape corresponding to the head to the shoulder of the human body has been detected, or an estimation method using a detection result of another feature amount or an amount of motion.

Figure 2:
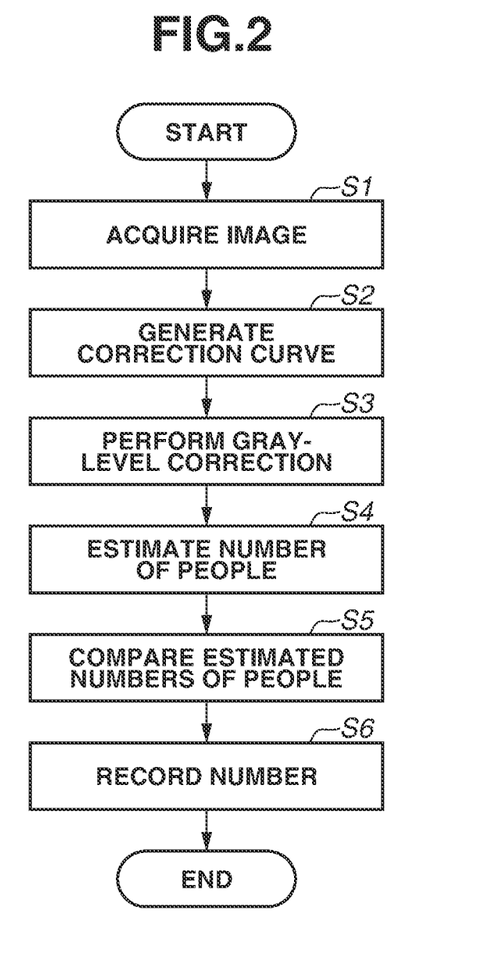
FIG. 2 is a flowchart illustrating an example of image processing in the image processing apparatus.

FIG. 2 is a flowchart illustrating an example of image processing of the information processing apparatus according to the first exemplary embodiment.

In step S1, the image acquisition unit 1 first acquires an image of the target region. The image acquisition unit 1 may acquire the image from an imaging element, such as a complementary metal-oxide semiconductor (CMOS) sensor, or acquire the image recorded in an external apparatus, such as a hard disk drive. Subsequently, in step S2, the gray-level correction unit 2 generates a plurality of correction curves having different correction amounts. As a method for generating the correction curves, the correction curves may be sequentially generated in reference to a correction curve table prepared in advance, or the correction curves in accordance with images may be generated through a method described below (refer to FIGS. 3A to 3D).

Figure 3A:
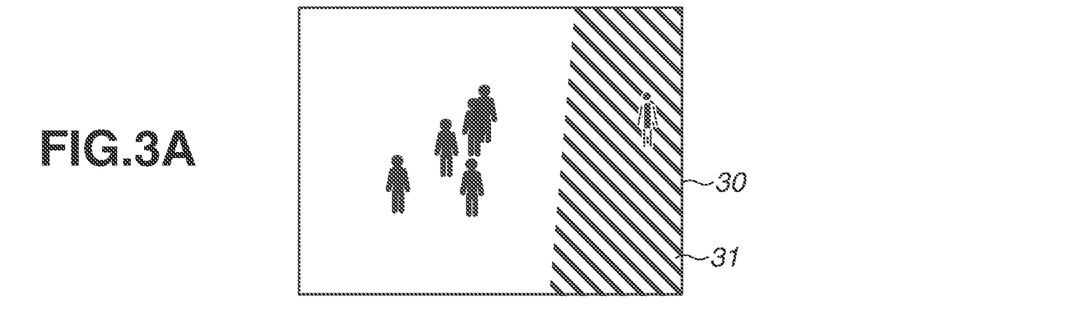
FIG. 3A is a diagram illustrating an estimation target image and FIGS. 3B to 3D are graphs acquired by the estimation target image.

FIGS. 3A to 3D are diagrams illustrating the method for generating the correction curve. FIG. 3A illustrates an estimation target image, and FIGS. 3B to 3D each illustrate an example of a histogram that can be acquired from the estimation target image. FIG. 3A illustrates an example of an image 30 which is an estimation target and in which a contrast decreases under the influence of fog, mist, or the like. A hatched portion 31 indicates a region in which illuminance is locally low, such as a shady region. Thus, in FIG. 3B that illustrates a histogram of FIG. 3A, a frequency is high in a middle luminance region.

Figure 3B:
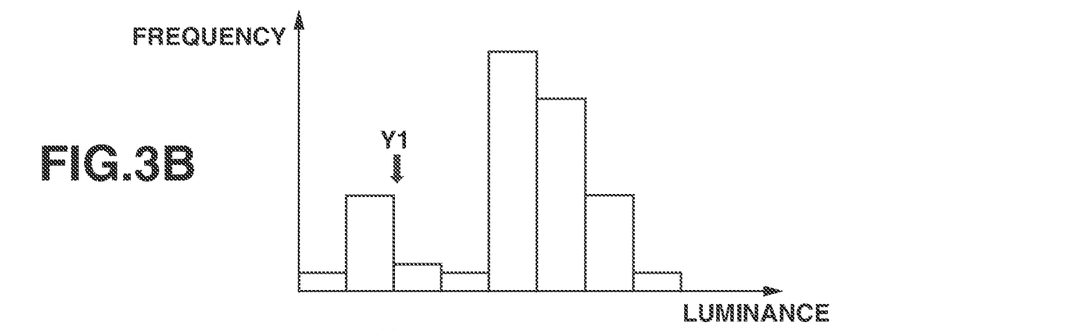

The histogram is typically formed by dividing a range of luminance that can be taken by each pixel of the image by a predetermined division number into a plurality of sections, and counting the number of pixels having luminance belonging to the respective sections by scanning the image to calculate frequencies. While an example of dividing the range of luminance into eight is described for explanation in the present exemplary embodiment, the division number is not specifically limited.

An example of the method for generating the correction curve will be described below with reference to FIGS. 3A to 3D.

The gray-level correction unit 2 first divides the image into a plurality of regions in accordance with luminance Filtering processing or the like to reduce high-frequency components of the image may be performed as preprocessing for the division into regions in accordance with a global luminance distribution.

A description will be provided of an example in which the image is divided with a predetermined luminance Y1 serving as a boundary.

In the example illustrated in FIG. 3A, for example, the gray-level correction unit 2 divides the image by setting a region having luminance that is less than the predetermined luminance Y1 (hatched portion 31) as a low luminance region, and setting the other region as a non-low luminance region. Subsequently, the gray-level correction unit 2 creates a histogram of the image. At this time, in counting a frequency of pixels present in the low luminance region, the gray-level correction unit 2 calculates the frequency by not adding one to a frequency, but adding a value obtained by multiplying one by a first weight w1 to the frequency. By contrast, for the non-low luminance region, the gray-level correction unit 2 calculates the frequency by adding a value obtained by multiplying one by a second weight w2 to the frequency. At this time, the gray-level correction unit 2 sets the first weight w1 and the second weight w2 such that an average of weights for all the pixels becomes one.

Figure 3C:
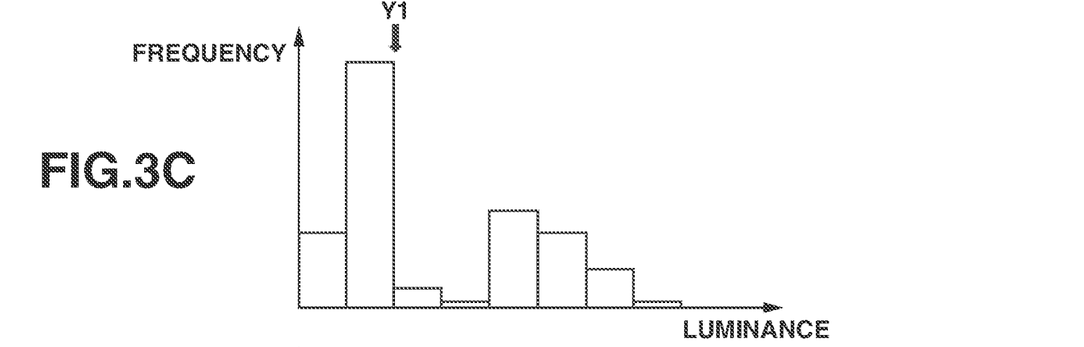

FIG. 3C illustrates an example of a weighted histogram created with assigned weights as described above. If the histogram is calculated with assigned weights in this manner, a resultant histogram indicates that the frequency of the low luminance region is emphasized as illustrated in FIG. 3C.

Figure 3D:
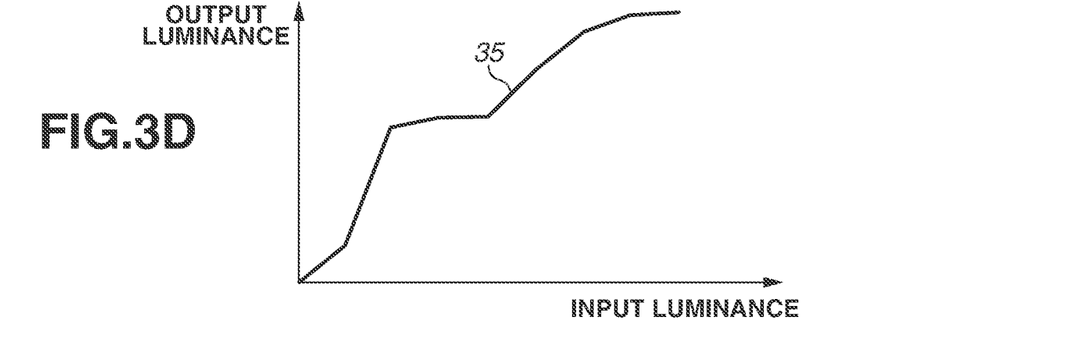

Thereafter, the gray-level correction unit 2 generates a correction curve 35 having input/output characteristics inclined in proportion to the frequency in each section of the weighted histogram, as illustrated in FIG. 3D. That is, the gray-level correction unit 2 determines the correction curve such that the inclination of the correction curve becomes greater in a region having a higher luminance frequency. The gray-level correction unit 2 can acquire an image in which a contrast in the low luminance region is emphasized by performing gray-level correction on the image acquired by the image acquisition unit 1, on the basis of the correction curve created in this manner. As a result, the number estimation unit 3 according to the present exemplary embodiment can increase accuracy in estimating the number in the low luminance region in comparison with a case where the number is estimated from an image that has not been subjected to the gray-level correction. Alternatively, creating a histogram that emphasizes a frequency in the high luminance region by dividing the image into the high luminance region and a non-high luminance region using, instead of the luminance Y1, luminance Y2 that is higher than the luminance Y1 enables creation of a correction curve that emphasizes a contrast in the high luminance region. With the use of the first luminance Y1 and the second luminance Y2, a correction curve that emphasizes a frequency in the middle luminance region in which the luminance is greater than or equal to the first luminance Y1 and less than or equal to the second luminance Y2 can be generated. Furthermore, various correction curves can be created by varying the first luminance Y1, the second luminance Y2, the first weight w1, and the second weight w2.

Referring back to FIG. 2, in step S3 after step S2, the gray-level correction unit 2 performs gray-level correction on the basis of each generated correction curve, and outputs a plurality of images for estimation.

In step S4, the number estimation unit 3 estimates the number of people for the plurality of images for estimation that have been subjected to the gray-level correction by the gray-level correction unit 2. Subsequently in step S5, the number estimation unit 3 compares the numbers of people estimated for the plurality of images for estimation. Furthermore, in step S6, the number estimation unit 3 selects the largest estimated number of people from among the plurality of estimated numbers of people in accordance with a result of the comparison, and supplies the largest estimated number of people to the number recording unit 4. The number recording unit 4 records the estimated number of people supplied by the number estimation unit 3. Here, different regions may take a different largest estimated number of people in the correction curve, so that the entire region may be divided into a plurality of regions for recording in advance and the largest estimated number of people may be recorded for each region for recording. In other words, the number of specific objects included in the image in the target region may be estimated in accordance with the estimated number of target objects in any of the divided regions.

As described above, in the present exemplary embodiment, estimating the number of specific objects using the image in which a contrast in the low luminance region is emphasized can increase accuracy in estimating the number of specific objects in the image. In the present exemplary embodiment, estimating the number of people in the images for estimation that have been subjected to the correction and selecting the largest estimated number of people among the estimated numbers of people can further increase accuracy in estimating the number of specific objects in the image.

Second Embodiment

Figure 4:
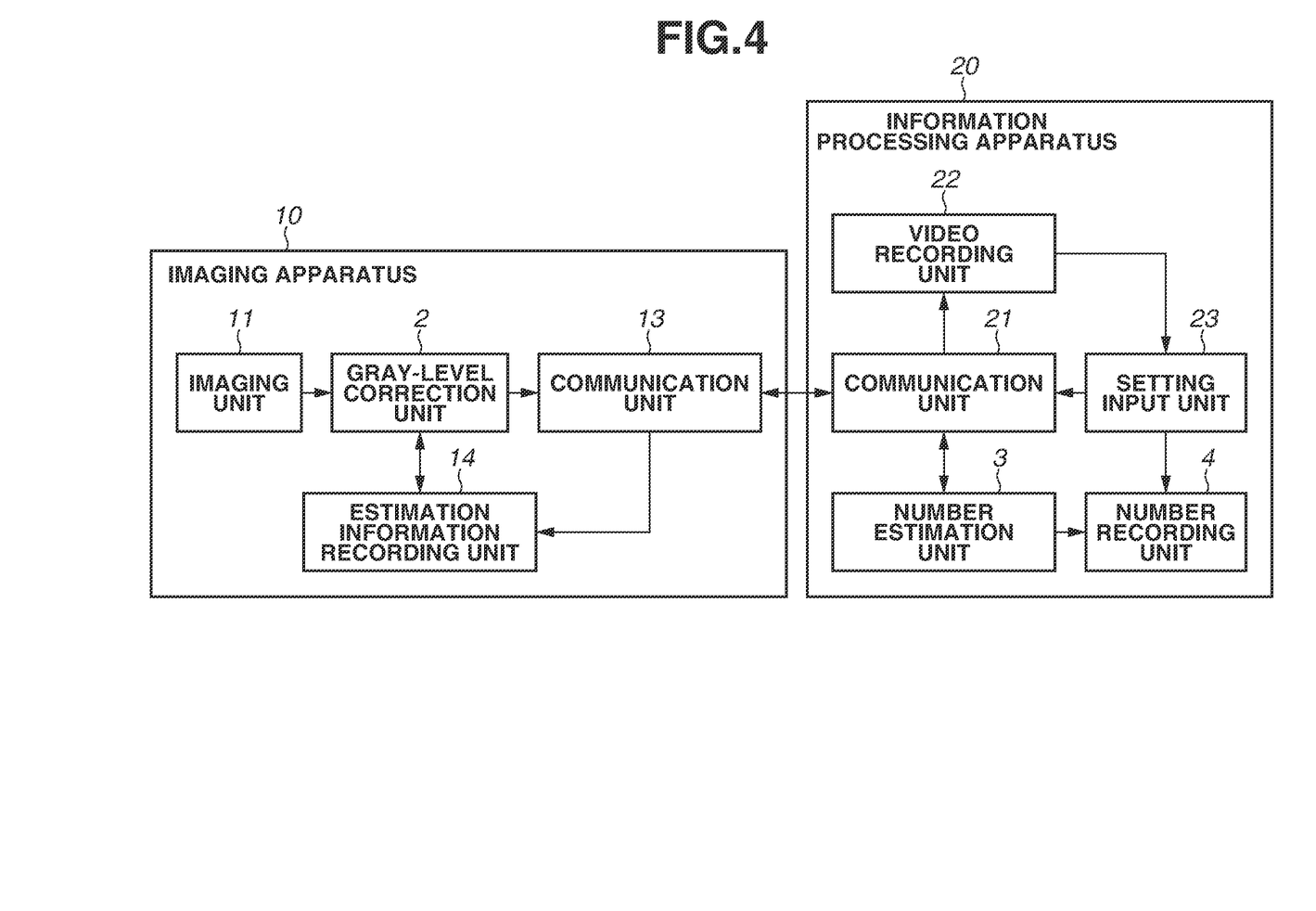
FIG. 4 is a block diagram illustrating a configuration example of an image processing system according to a second exemplary embodiment.

FIG. 4 is a block diagram illustrating a configuration example of an image processing system according to a second exemplary embodiment.

A constituent element of the image processing system that is the same as the image processing apparatus according to the first exemplary embodiment described above or a corresponding part is denoted by the same reference sign and a description thereof will be omitted.

The image processing system includes an imaging apparatus 10 that captures an image of the target region and an information processing apparatus 20 that performs processing on the image captured by the imaging apparatus 10.

The imaging apparatus 10 includes an imaging unit 11 in substitution for the image acquisition unit 1, the gray-level correction unit 2 that corrects levels of gray of the image from the imaging unit 11, a communication unit 13 that communicates with the information processing apparatus 20, and an estimation information recording unit 14 that records estimation information.

The imaging unit 11 outputs consecutive frame images captured by image-capturing to the gray-level correction unit 2. The communication unit 13 transmits the frame images that have been subjected to the gray-level correction by the gray-level correction unit 2 to the information processing apparatus 20. The estimation information recording unit 14 records, as a set of estimation information, the estimated number acquired from the information processing apparatus 20 via the communication unit 13 and a correction curve with respect to a frame image that can be acquired from the gray-level correction unit 2 and that serves as an estimation target.

The information processing apparatus 20 includes a communication unit 21 that communicates with the imaging apparatus 10, a video recording unit 22 that records video from the imaging apparatus 10, a setting input unit 23 that inputs settings, the number estimation unit 3, and the number recording unit 4. The video recording unit 22 includes a recording device, such as a storage device and a memory device. In the present exemplary embodiment, the number estimation unit 3 is capable of outputting positional information indicating a position of an object on the image as well as the estimated number of people.

The communication unit 21 transmits the positional information estimated by the number estimation unit 3 to the imaging apparatus 10.

The video recording unit 22 records the frame images received from the imaging apparatus 10 via the communication unit 21. The setting input unit 23 inputs confirmation of the frame images recorded in the video recording unit 22, selection of an estimation target region in which the number of specific objects is estimated, and settings, such as a setting for a recording period of the number estimation unit 3, via a user interface such as a display device and a keyboard.

Periodic estimation of the number of people in the image processing system will be described below with reference to FIG. 5.

Figure 5:
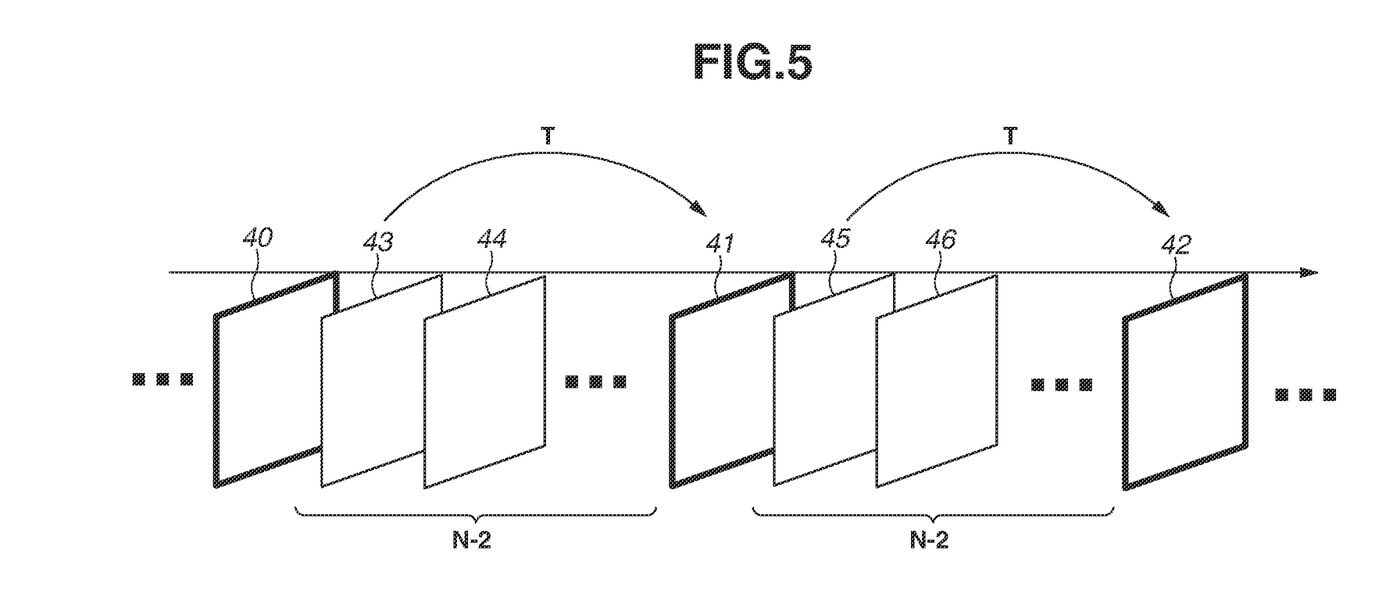
FIG. 5 is a diagram illustrating an example of allocation of recording frame images in which the estimated number of people is recorded with respect to temporally consecutive frame images by a number recording unit.

FIG. 5 is a diagram illustrating allocation of recording frame images to temporally consecutive frame images. The recording frame images are frame images in which the estimated numbers of people estimated by the number estimation unit 3 are recorded. FIG. 5 illustrates recording frame images 40, 41, and 42, and non-recording frame images (e.g., 43, 44, 45, and 46) other than the recording frame images 40, 41, and 42.

The number estimation unit 3 estimates the number of people in the image in a manner similar to the first exemplary embodiment described above every recording period T. The recording period T can be set with the setting input unit 23. The recording period T can be changed with the setting input unit 23. When the number of frame images supplied from the imaging apparatus 10 during the recording period T is N, there are N−2 non-recording frame images for the number of people is not estimated, between two recording frame images (e.g., between recording frame images 40 and 41, and between recording frame images 41 and 42). The present exemplary embodiment uses the N−2 non-recording frame images to search for a suitable correction curve for the next recording frame image.

Figure 6:
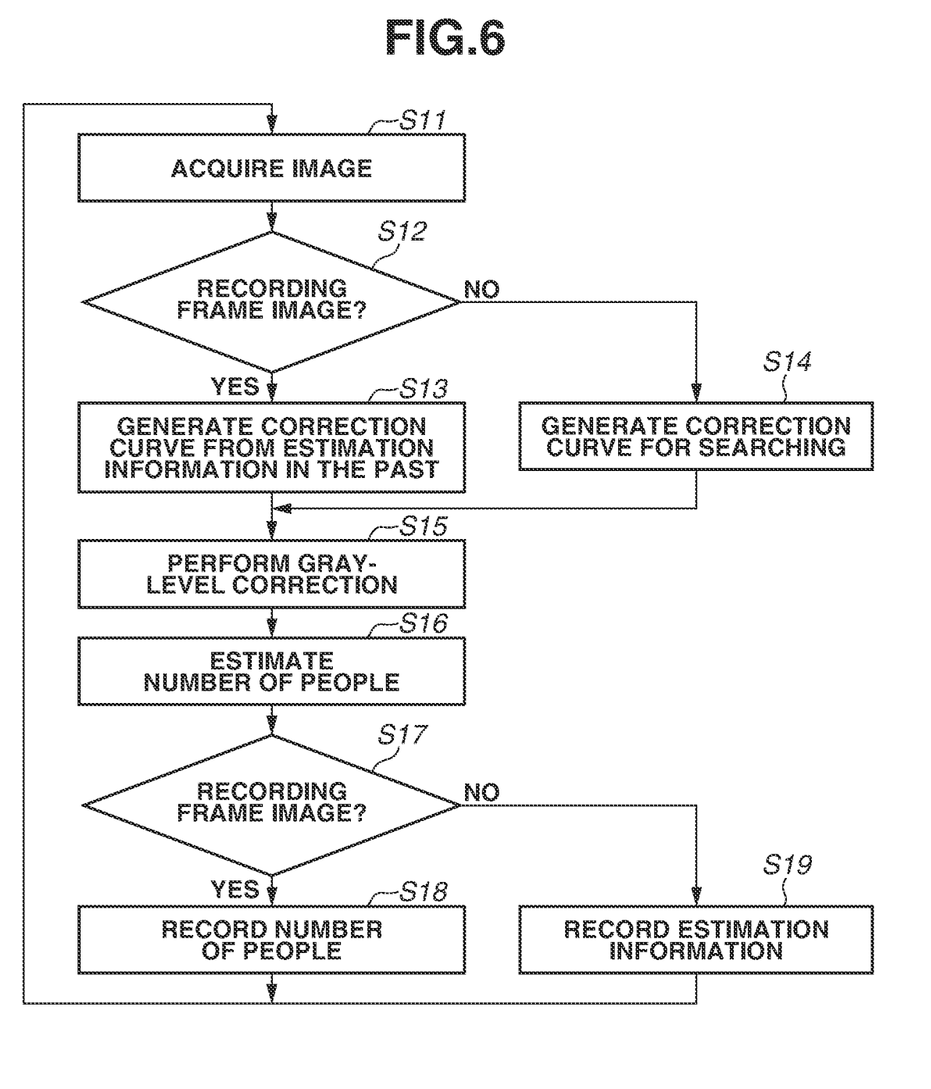
FIG. 6 is a flowchart illustrating an example of image processing in the image processing system.

FIG. 6 is a flowchart illustrating an example of image processing in the image processing system according to the present exemplary embodiment.

In step S11, the imaging unit 11 first captures an image of the target region to acquire a frame image. Subsequently, in step S12, the gray-level correction unit 2 determines whether a present frame image from the imaging unit 11 is a recording frame image. If the present frame image is the recording frame image (YES in step S12), the processing proceeds to step S13. In step S13, the gray-level correction unit 2 refers to estimation information in the past recorded in the estimation information recording unit 14 to generate a correction curve indicating the largest estimated number of people.

If the present frame image is not the recording frame image (NO in step S12), the processing proceeds to step S14. In step S14, the gray-level correction unit 2 generates a correction curve for searching, and the processing proceeds to step S15. A method for generating the correction curve for searching will be described below.

In step S15, the gray-level correction unit 2 performs gray-level correction on the basis of the correction curve generated in step S13 or step S14.

In step S16, the number estimation unit 3 estimates the number of people for the frame image acquired from the imaging apparatus 10 via the communication unit 21.

Subsequently, in step S17, the number estimation unit 3 determines whether the present frame image is the recording frame image. If the number estimation unit 3 determines that the present frame image is the recording frame image (YES in step S17), the processing proceeds to step S18. In step S18, the number estimation unit 3 records the estimated number of people in the number recording unit 4, and the processing returns to step S11.

If the number estimation unit 3 determines that the present frame image is not the recording frame image (NO in step S17), the processing proceeds to step S19. In step S19, the number estimation unit 3 records the estimated number of people and data about the correction curve with respect to the present frame image that serves as the estimation target as a set of estimation information, and the processing returns to step S11.

Figure 7A:
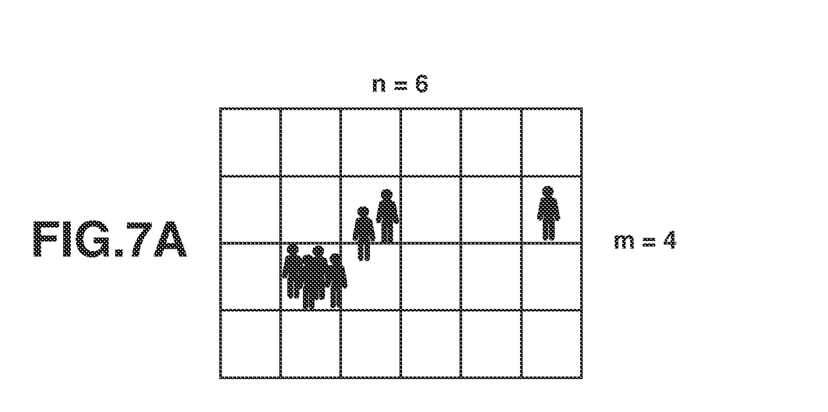
FIGS. 7A to 7C are diagrams each illustrating an example of an estimation target image and positional information acquired by a number estimation unit.
Figure 7B:
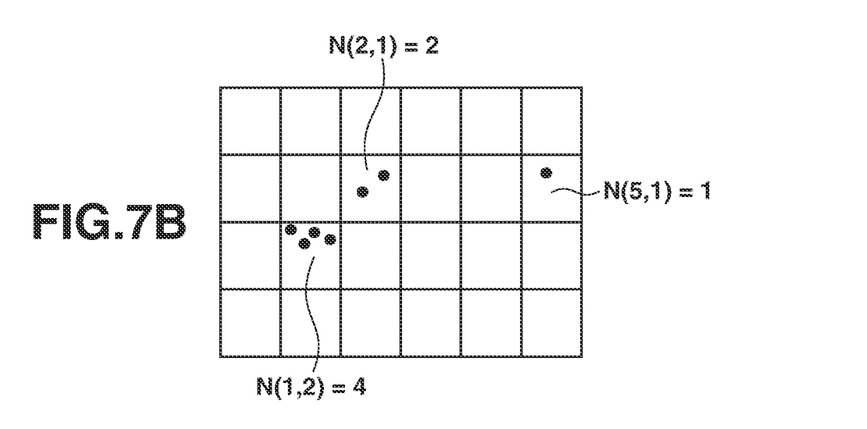
Figure 7C:
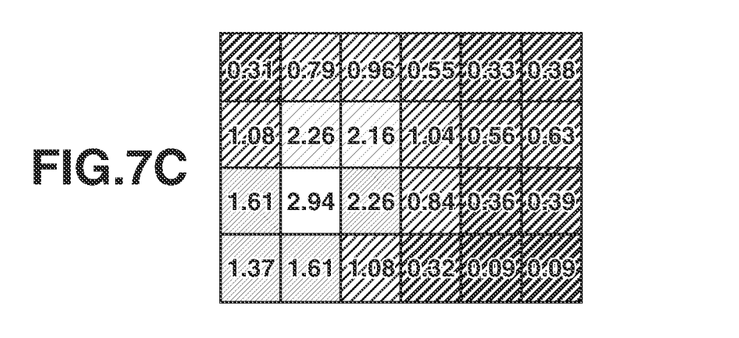

FIGS. 7A to 7C are diagrams each illustrating an example of the estimation target image and positional information acquired by the number estimation unit 3.

The method for generating the correction curve for searching will be described below with reference to FIGS. 7A to 7C.

While a weighted histogram is generated to generate a correction curve in a manner similar to the first embodiment in the method for generating the correction curve for searching, weights are generated using the positional information recorded as an estimation information record in the second embodiment. A description will be provided of a case where an image is divided into rectangular blocks of 6×4 and a weight with respect to each block is calculated, as illustrated, for example, in FIG. 7A. A weight $W_{(i,j)}$ is calculated, for example, through the following Expressions (1) and (2).

$$w_{(i,j)} = \sum_{x=0,y=0}^{x=n,y=m} \frac{N_{(x,y)}}{N_{sum}} \left(\frac{1}{2\pi\sigma^2}\right) \exp\left(-\frac{(i-x)^2 + (j-y)^2}{2\sigma^2}\right) \quad (1)$$

$$W_{(i,j)} = \frac{w_{(i,j)}}{(\sum w_{(i,j)}/nm)} \quad (2)$$

In Expression (1), $N_{(x,y)}$ is the estimated number of people in one block, $N_{sum}$ is the estimated number of people in the entire frame image, as illustrated in FIG. 7B. In Expression (1), σ is any coefficient, n and m are a region division number. In the present embodiment, n=6 and m=4. FIG. 7C illustrates an example of weights calculated with σ=1. As can be found from FIG. 7C, calculating a weight using Expressions (1) and (2) can make the weight greater in a block having a higher density of people. Here, since the number estimation unit 3 is arranged in a later stage than the gray-level correction unit 2, the positional information that has been estimated for a frame image prior to the present frame image is used. Thus, there is a possibility that an update rate of the positional information decreases due to a delay of the communication units 13 and 21 and depending on a calculation cost (calculation time) of the number estimation unit 3. To avoid this, every other divided region of the divided regions in a rectangular block shape, instead of all the divided regions, may serve as the estimation target region of the number estimation unit 3. With respect to a non-estimation target region, a result of linear prediction from the estimated number in its surrounding estimation target region may serve as the estimated number.

As described above, performing the processing in accordance with a density emphasizes a contrast with a region with a higher existence possibility of people being focused, thus increasing efficiency of estimation of the number of specific objects in the image. By contrast, a possibility of an appearance of a new specific object or a possibility of the existence of a specific object that has not been detected by estimation in the initial stage by the number estimation unit 3 may be taken into consideration. Specifically, weighting calculation may be performed such that a weight for a region having a low density increases in a case where the estimated number between frames does not change or decreases for a predetermined number of frames. The gray-level correction unit 2 may perform gray-level correction on a region-by-region basis. In such a case, the gray-level correction unit 2 may update, on the region-by-region basis, a correction curve for only a region in which the estimated number increases and independently perform gray-level correction on an individual region.

Since different gray-level correction is performed for each frame with respect to images stored in the video recording unit 22, acute change in luminance may occur between adjacent frame images. Thus, the gray-level correction unit 2 may use the weight calculated with respect to the present frame image, the correction curve and the weight calculated with respect to the immediately preceding frame image, or synthesized correction curves using a predetermined coefficient. At this time, in order to respond to an acute change in angle of view, illuminance, and the like, an image change amount calculation unit (not illustrated) capable of calculating a change amount between frames with background subtraction and/or an amount of motion may be added. In such a case, the gray-level correction unit 2 may make a setting such that the larger a change amount between frames is, the larger a weight calculated using a predetermined coefficient with respect to the present frame image becomes or the larger the influence of the correction curve becomes.

In a case where the estimation target region is selected by the setting input unit 23, a calculation cost may be reduced by limiting a region to be subjected to the gray-level correction on the condition that a processing target region in steps S12 to S19 contains therein the estimation target region.

As described above, the present exemplary embodiment can increase accuracy in estimating the number of specific objects in the image as in the first exemplary embodiment.

In the present exemplary embodiment, searching for a correction curve suitable for the next recording frame image using the non-recording frame can further improve accuracy in estimating the number of specific objects in the image. According to the present exemplary embodiment, the determining of a correction amount in accordance with a density of the specific objects and the determining of the correction amount such that a luminance frequency in a region having the density that is higher than a threshold is emphasized can further improve accuracy in estimating the number of specific objects in the image.

While desirable exemplary embodiments of the present disclosure have been described, the present disclosure is not limited to these exemplary embodiments, and various modifications and changes can be made without departing from the gist of the present disclosure. While the gray-level correction unit 2 is arranged in the imaging apparatus 10 in FIG. 4, the gray-level correction unit 2 may be arranged in the information processing apparatus 20. While the imaging apparatus 10 and the information processing apparatus 20 are illustrated as separate apparatuses, the information processing apparatus 20 may be incorporated in the imaging apparatus 10.

Other Exemplary Embodiment

While the exemplary embodiments have been described in detail above, the present disclosure can be applied to an exemplary embodiment as, for example, a system, an apparatus, a method, a program, or a recording medium (storage medium). More specifically, the present disclosure may be applied to a system including a plurality of devices (e.g., host computer, interface device, imaging apparatus, and web application), or may be applied to an apparatus including a single device.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-170665, filed Sep. 19, 2019, which is hereby incorporated by reference herein in its entirety.

What is claimed is:

1. An image processing apparatus, comprising a computer executing instructions that, when executed by the computer, cause the computer to:
    perform first gray-level correction on an image using a first correction curve, to generate a first image;
    estimate a number of specific objects in the first image;
    perform second gray-level correction on the image using a second correction curve that is different from the first correction curve, to generate a second image;
    estimate a number of the specific objects in the second image; and
    select, as an estimated result, a larger one of (a) the estimated number of the specific objects in the first image and (b) the estimated number of the specific objects in the second image.

2. The image processing apparatus according to claim 1, wherein the instructions further cause the computer to calculate a first histogram which is based on luminances of the image, and calculate a second histogram which is based on the luminances of the image, the second histogram being calculated with different calculation of the first histogram,
    wherein the first correction curve is determined using the first histogram, and
    wherein the second correction curve is determined using the second histogram.

3. The image processing apparatus according to claim 2, wherein a weight used for calculating the first histogram is assigned such that a luminance frequency of a region set on the basis of a first luminance is emphasized, and
    wherein a weight used for calculating the second histogram is assigned such that a luminance frequency of a region set on the basis of a second luminance is emphasized.

4. The image processing apparatus according to claim 2, wherein the first correction curve is determined such that an inclination of the first correction curve becomes greater in a region having a higher luminance frequency in the first histogram,
    wherein the second correction curve is determined such that an inclination of the second correction curve becomes greater in a region having a higher luminance frequency in the second histogram.

5. The image processing apparatus according to claim 1, wherein the first correction curve is generated based on the first histogram obtained by counting a luminance frequency of pixels in the image with using a weight,
    wherein the second correction curve is generated based on the second histogram obtained by counting a luminance frequency of pixels in the image with using a weight which is different from the weight used for obtaining the first histogram.

6. An image processing method, comprising:
    performing first gray-level correction on an image using a first correction curve to generate a first image;
    estimating a number of specific objects in the first image;
    performing second gray-level correction on the image using a second correction curve that is different from the first correction curve, to generate a second image;
    estimating a number of the specific objects in the second image; and selecting, as an estimated result, a larger one of (a) the estimated numbers of the specific objects in the first image and (b) the estimated number of the specific objects in the second image.

7. A non-transitory computer-readable storage medium storing a program which, when read and executed by a computer, causes the computer to execute steps of an image processing method, the method comprising:

performing first gray-level correction on an image using a first correction curve to generate a first image;

estimating a number of specific objects in the first image;

performing second gray-level correction on the image using a second correction curve that is different from the first correction curve, to generate a second image;

estimating a number of the specific objects in the second image; and selecting, as an estimated result, a larger one of (a) the estimated numbers of the specific objects in the first image and (b) the estimated number of the specific objects in the second image.

* * * * *